Oct. 19, 1971 T. O. PAINE 3,613,457
ADMINISTRATOR OF THE NATIONAL AERONAUTICS
AND SPACE ADMINISTRATION
ISOLATION COUPLING ARRANGEMENT FOR A TORQUE
MEASURING SYSTEM
Filed Nov. 29, 1969

INVENTORS
LAWRENCE P. DAVIS
JAMES E. CRUTCHER
JERALD H. WEIDENHAMER

ATTORNEYS

United States Patent Office 3,613,457
Patented Oct. 19, 1971

3,613,457
ISOLATION COUPLING ARRANGEMENT FOR A TORQUE MEASURING SYSTEM
Thomas O. Paine, Administrator of the National Aeronautics and Space Administration, with respect to an invention of Lawrence P. Davis, James E. Crutcher, and Jerald H. Weidenhamer, all of Phoenix, Ariz.
Filed Nov. 29, 1969, Ser. No. 880,249
Int. Cl. G01l 3/10; G01c 19/00
U.S. Cl. 73—133                                    7 Claims

ABSTRACT OF THE DISCLOSURE

A coupling arrangement for isolating the torque loads from axial, radial, and bending loads in a load path having a torque measuring transducer therein so as to eliminate errors in torque measurement resulting from their imposition on the transducer, while retaining substantial support for these loads. This is attained by the use of a pair of flexures connected in parallel in the load path which have complementary load bearing characteristics, a first one compliant to radial, axial, and bending loads and rigid under torque, the second having opposite characterstics, with the transducer measuring the torque carried by the first flexure.

ORIGIN OF THE INVENTION

The invention described herein was made in the performance of work under a NASA contract and is subject to the provisions of Section 305 of the National Aeronautics Space Act of 1958, Public Law 85–568 (72 Stat. 435 U.S.C. 2457).

This invention relates to an isolation coupling especially adapted for use in a torque measuring system.

In conducting research on stabilization and control of spacecraft, simulation devices have been developed. A typical such device consists of a control moment gyro system mounted on a three-axis gimbal arrangement which provides the spacecraft dynamic environment. An additional requirement of such research is the three-axis measurement of torques exerted by the gyro system. However, accurate measurements in a dynamic environment are complicated by the need for adequate support about each axis for axial, radial, and bending loads since movement of the gyro about these axes imposes varying stresses as rotation of the various gimbals shifts the center of gravity of the supported mass and other gimbals with respect to the axes of measurement. If the member incorporating the torque-measuring transducer was made sufficiently rigid to support these loads, substantial errors were introduced, while constructing such member to be compliant in these directions would not provide adequate support.

Therefore it is an object of the present invention to provide an isolation coupling and torque measuring system which will give adequate axial, radial, and bending support of coupled members, yet will provide a torque-measuring load path which is free from the influence of these loads.

This is accomplished by the use of a pair of flexures carrying the load in parallel, with one flexure being compliant in axial, radial and bending directions, while being rigid in torsion and with the other flexure being rigid in the axial, radial, and bending modes, and compliant in torsion. The transducer is secured to the first flexure to thus measure only torque about the axis of interest.

The specific embodiment disclosed incorporating the inventive concept may be more clearly understood by reference to the drawings, in which.

Figure 2:
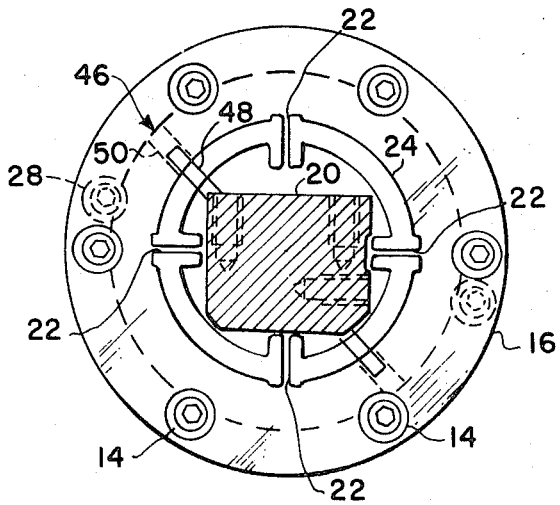
FIG. 2 is a view of the section taken along the line 2—2 of FIG. 1 with a portion omitted for clarity.
Figure 1:
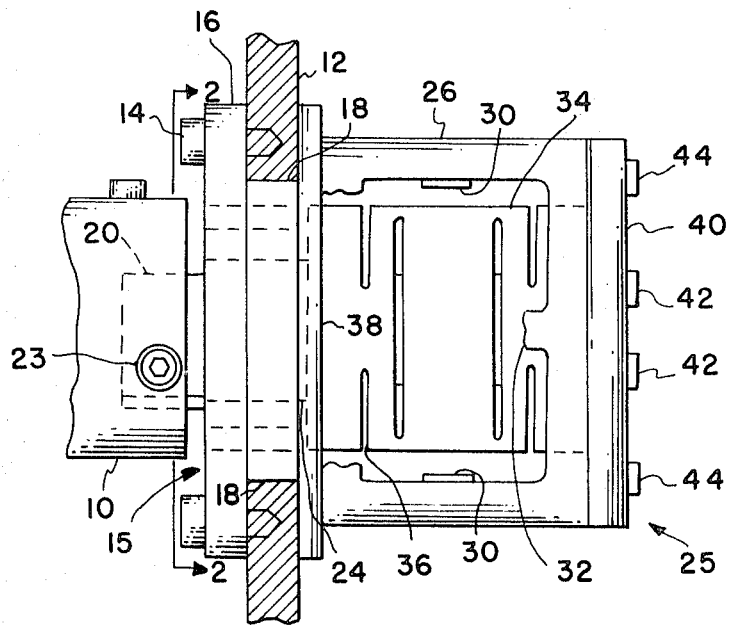
FIG. 1 is a side elevation of a typical installation of the invention.

Referring now to the drawings, the primary members are shown at 10 and 12 which may be inner and outer gimbals of a multiple axis system or may be a gimbal and its associated base.

Extending between these members 10 and 12 is a pair of load paths with mutually exclusive load bearing characteristics. The first of these is occupied by the pivot flexure 15 arrangement, including a circular plate member 16, secured to the member 12 by means of capscrews 14 having a shoulder 18 formed thereon fitting into an opening formed in member 12.

Secured to the other primary member 10 by capscrews 23 is a central plug portion 20 extending into a complementary opening in the member 10. Forming a connection therebetween are four thin webs 22 integral with an interior opening in plate 16 and a cylindrical portion 24 integral with hte plug portion 20.

This connection has the characteristic of being relatively rigid against radial, axial and bending loads applied along the axis of member 10, but offers very little resistance to slight angular movements about this axis.

Forming the other load path is the isolation flexure arrangement. Flanged cage member 26 is secured to primary member 12 by capscrews 28. Cage member 26 is designed as a torque measuring element, and as such has strain gage assemblies 30 applied to webs 32, in a manner well known in the prior art, to enable measurement of the torque transmitted by the member 26.

Integral with cylinder portion 24 is the isolation flexure portion. This element is rather well known in itself, and is comprised of a hollow cylinder portion 34 into which are machined slots 36 which extend entirely through hollow cylinder portion 34, except for two solid portions 38 located at opposite sides of the cylinder. Successive slots alternately position these solid portions 90° from the solid portions left by the preceding slot.

This element is secured to cage member 26 by an end cap 40 secured by means of capscrews 42 and 44 to both elements.

The isolation flexure possesses the property of being relatively compliant to bending due to radial, and axial loads, but being rigid to torque loads applied about the axis of member 10.

Figure 3:
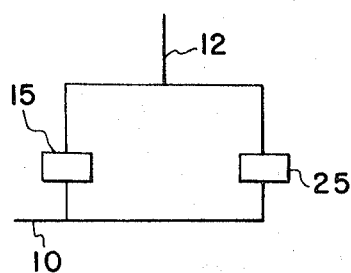
FIG. 3 is a schematic representation of the load paths of the structure shown in FIGS. 1 and 2.

Reference to FIG. 3 gives a simple schematic representation of the load paths. Torque loads between 10 and 12 are not absorbed by flexure 15, since it is compliant in this direction and since flexure 25 is rigid in this direction. Thus, the transducer element 26 "feels" the entire torque load. Bending radial and axial loads, on the other hand, are borne entirely by flexure 15 since it is relatively rigid in these directions and since flexure 25 is compliant along these directions. Thus substantial support is supplied for resistance to any of these loads, but the transducer element 26 does not "feel" any of them, and resulting potential errors are eliminated.

A pair of overload stops 46 may be provided in order to insure against excessive rotative movement of the members 10 and 12 beyond the design limits of the webs 22. These may take the form of a pair of pins 48 inserted into bores in the members 16 and 24. A clearance in the bore 50 allows for relative movement between members 16 and 24, but bottoms out once such movement exceeds a predetermined maximum.

While in describing the specific embodiment specific connections and flexures are described, the invention may be practiced in a variety of other methods. For example, if accuracy requirements allow, the pivot flexure may be replaced with a precision bearing, suitably mounted to resist thrust loads, or commercial cross-spring pivots may be incorporated. Similarly, other isolation flexures and connections may be substituted.

What is claimed as new and desired to be secured by Letters Patent of the United States is:

1. A load measuring system comprising:
a first and second primary member;
first coupling means drivingly connected to said first and second members and compliant to radial, axial, and bending loads about an axis directed approximate to said primary members and rigid to torque loading along said axis;
a second coupling means drivingly connected to said first and second primary members and compliant to torque loading about said axis and rigid to axial, bending, and radial loads about said axis;
means for measuring the load carried by one of said members to which it is rigid, whereby said at least one load is measured free from the influence of said at least one other load between said primary members while providing support for said loads.

2. The system of claim 1 wherein said first and second coupling means includes a central member alined with said axis and connected to one of said primary members and said second coupling means includes radially directed webs connected at one end to said central member and also includes means connecting said other primary member.

3. The system of claim 2 wherein said first coupling means includes a hollow cylinder member connected to said central member at one end and having a plurality of circumferential slots, and means connecting the other end of said hollow cylinder to said other primary member.

4. The system of claim 1 wherein said measuring means measures the torque load carried by said first coupling means.

5. The system of claim 4 wherein said measuring means measures the torque carried by said means connecting said other end of said cylinder to said primary member.

6. A load dividing coupling arrangement comprising:
first and second primary members;
a central member alined along an axis proximate to both of said primary members and connected to one of said primary members;
a first coupling means connected to said central member and to the primary member other than said one and rigid to torque loads but compliant to axial, radial, and bending loads about said axis;
a second coupling means including at least two radially directed webs connected at one end to said central member and also including means connecting the other ends of said webs to said other primary member, whereby said first coupling means is loaded only in torsion while said second coupling means web members provide support for radial, axial, and bending loads about said axis.

7. The coupling of claim 6 wherein said second coupling means includes four radially and oppositely directed, longitudinally juxtaposed webs connected at one end to said central member.

References Cited

UNITED STATES PATENTS

| | | | |
|---|---|---|---|
| 2,505,636 | 4/1950 | Carter | 73—505 |
| 3,206,986 | 9/1965 | Christenson | 73—505 |
| 3,238,789 | 3/1966 | Erdley | 73—517 |
| 3,267,746 | 8/1966 | Scotto | 74—5.6 |
| 3,481,208 | 12/1969 | Thrasher et al. | 77—5 X |
| 3,520,195 | 7/1970 | Tehon | 73—505 |
| 2,741,120 | 4/1956 | Ormsby, Jr. | 73—141 A |
| 3,464,259 | 9/1969 | Farr | 73—133 X |

MANUEL A. ANTONAKAS, Primary Examiner

U.S. Cl. X.R.

73—141 A; 74—5, 5.6